United States Patent
Spoelstra

(10) Patent No.: US 6,926,370 B2
(45) Date of Patent: Aug. 9, 2005

(54) COMPOSITE WHEEL AND METHOD FOR ITS MANUFACTURE

(75) Inventor: Jan Spoelstra, Sneek (NL)

(73) Assignee: Prins Dokkum B.V., Dokkum (NL)

( * ) Notice: Subject to any disclaimer, the term of this patent is extended or adjusted under 35 U.S.C. 154(b) by 0 days.

(21) Appl. No.: 10/363,564

(22) PCT Filed: Sep. 3, 2001

(86) PCT No.: PCT/NL01/00649

§ 371 (c)(1),
(2), (4) Date: Jun. 2, 2003

(87) PCT Pub. No.: WO02/20252

PCT Pub. Date: Mar. 14, 2002

(65) Prior Publication Data

US 2003/0189373 A1 Oct. 9, 2003

Related U.S. Application Data

(60) Provisional application No. 60/240,951, filed on Sep. 13, 2000.

(30) Foreign Application Priority Data

Sep. 5, 2000 (NL) .............................................. 1016108

(51) Int. Cl.[7] .................................................. B60B 5/02
(52) U.S. Cl. .............................. 301/64.703; 301/64.706
(58) Field of Search ....................... 301/64.701, 64.702, 301/64.703, 64.706, 95.102, 95.103; 264/258, 292, 326

(56) References Cited

U.S. PATENT DOCUMENTS

| 4,514,013 | A | * | 4/1985 | Woelfel et al. ........ 301/64.703 |
| 4,532,097 | A | * | 7/1985 | Daniels et al. .............. 264/258 |
| 4,636,344 | A | * | 1/1987 | McDougall ................. 264/102 |
| 4,749,235 | A | * | 6/1988 | McDougall ........... 301/64.703 |
| 4,773,711 | A | * | 9/1988 | Griffiths et al. .......... 152/379.3 |
| 4,832,414 | A |   | 5/1989 | Jones |
| 5,045,261 | A | * | 9/1991 | Weeks ........................ 264/108 |

FOREIGN PATENT DOCUMENTS

| JP | 59184617 | 10/1984 |
| JP | 61079636 | 4/1986 |
| WO | WO 93/01930 | 2/1993 |

* cited by examiner

Primary Examiner—Russell D. Stormer
(74) Attorney, Agent, or Firm—Merchant & Gould P.C.

(57) ABSTRACT

A method of manufacturing a composite wheel. The wheel is composed by mats of oriented carbon fibers. The mats are impregnated with a synthetic resin. The wheel is composed of at least two portions previously built up, which form respectively the hub and the rim of the wheel. The rim portion can, viewed from a direction perpendicular to the central axis, have a section substantially symmetric relative to a central plane of symmetry, the distance measured from a side of the section facing the central axis to the central axis predominantly increasing in the direction pointing away from the mirror plane, and the hub portion having a correspondingly comically shaped outer edge, which fittingly lies against the side of the rim portion facing the central axis over a substantial distance.

14 Claims, 2 Drawing Sheets

COMPOSITE WHEEL AND METHOD FOR ITS MANUFACTURE

The invention relates to a method of manufacturing a wheel from composite material.

The manufacture of such wheels is known, for instance from European patent application EP-A 0 377 369. The use of composite materials results, inter alia, in relatively very light wheels, which is favorable to the fuel consumption and the loading capacity. However the wheels produced heretofore are unsuccessful from the viewpoint of durability, strength and security, so that up to now a large-scale use of composite wheels in road transport has not been possible very well. The object of the invention is to remove this drawback and to provide a method of applying a technique resulting in a very robust composite wheel having a great structural integrity.

This object is achieved by building up at least two separate preforms, which preforms form respectively a hub portion and a rim portion of the wheel, by compressing mats of oriented fibers into each of the respective preforms; combining the separate preforms; compressing them into one whole; and impregnating this compressed whole with a synthetic resin.

The manufacturing process according to the invention can be carried out in a very controlled manner, so that the wheel thus formed has very good structural properties.

Preferably, the manufacturing process of the invention comprises designing the hub portion in the shape of a cup with an end face and a raised edge, which end face extends in the radial direction of the wheel to be formed, and which raised edge extends predominantly in the axial direction thereof, and designing the rim portion such that when combining the preforms the raised edge portion of the hub portion extends along at least part of the inner side of the rim portion.

The rim portion has a side directed to the central axis, against which the hub portion lies with the correspondingly formed cap-shaped outer edge in clamped fitting condition over a substantial distance. Through this force fit structure the preforms are compressed into a robust solid whole, which can be easily handled in the further part of the manufacturing process. The cup-shaped geometry of the hub portion and the corresponding tapered form of the rim portion render it possible that they can be easily slid together and also have a favorable strength/stiffness of themselves. A preferred embodiment of the invention comprises the insertion in a rim portion, in the axial direction on both sides thereof, of two cup-shaped hub portions facing each other with the end faces.

By combining the preforms, closed open spaces can be formed. These spaces can be filled with a non-impregnable material; this material is preferably polyurethane. It serves to prevent the spaces from being filled with synthetic resin without fiber reinforcement being provided therein; such parts would make the structure unnecessarily heavy and be disadvantageous to the strength thereof. Furthermore, the spaces may be provided with transport material leading the resin through the space along predetermined paths; preferably, these are glass fiber strips. Such paths allow the impregnating process to proceed optimally.

Preferably, the preforms are built up by cutting mats from larger woven fiber mats, with a weaving pattern with two fiber orientations directed substantially transversely to each other, and which are provided with an agent bonding under the influence of heat; substantially orienting the mats in a circumferential direction and/or in a radial direction of the preform; and maintaining the shape of the mats under vacuum and heating the mats until the preform has been formed. The fabrics give the wheel very favorable strength properties, because it is possible to control the fiber orientation of the mats very accurately.

The fibers of a mat may have such an orientation that the orientation of fibers deviates by at most 10° relative to the radial/tangential direction of the wheel to be formed, preferably by at most 5°. In a preferred embodiment the ratio of fibers oriented transversely to each other is within the range of 0.7 to 1.4 per unit weight; it is preferably 1.

The manufacturing process can be carried out efficiently if the preforms are built up with mats having a relatively small size and a predetermined fixed basic shape. By limiting number of employed shapes, the manufacturing process remains manageable. By employing relatively small sizes, the fiber orientations can blend with each other without discontinuities or fractured areas. A further advantage is that the weight distribution in the preform can thus be influenced optimally.

The method of the invention may further comprise the steps of providing a number of bores in the compressed whole; and arranging therein closely fitting metal bushes before the impregnating step. By means of this method, the fiber structure around the metal bushes remains optimally intact; a close fitting introduces a negligible extra tension in the structure of the fibers. The bushes are fixed in the compressed whole by bonding them by means of the resin.

In a further preferred embodiment the impregnating step is carried out by injecting synthetic resin into the compressed whole via injection openings discharging on the outer side of the rim portion, and which substantially lie in one plane with the end face of the hub portion. In practice, these positions give suitable results when curing the resin.

The invention further relates to a wheel formed according to at least one of the above-mentioned methods.

The invention will be explained in more detail with reference to the drawings, in which.

In the figures similar or corresponding parts are represented by similar reference numerals.

Figure 1:
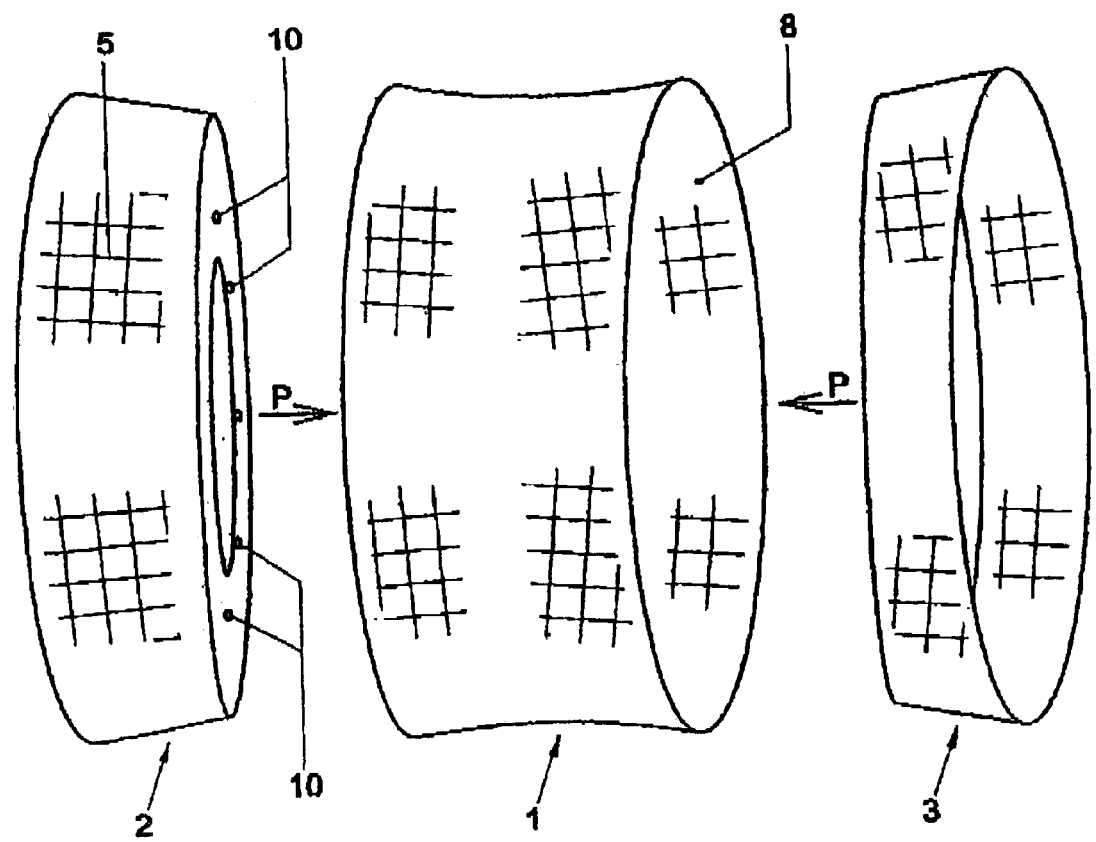
FIG. 1 is a diagrammatic perspective view of the assembly of three separate preforms into a wheel according to the invention.
Figure 2:
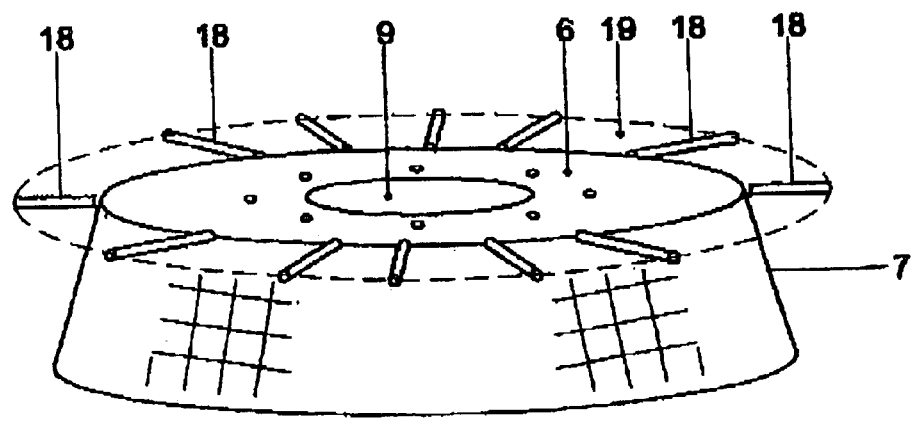
FIG. 2 is a diagrammatic perspective view of a preform forming a hub portion.

FIG. 1 shows a preform 1, a preform 2 and a preform 3, preform 1 being designed so as to form a rim portion of a composite wheel 4 to be formed. Preforms 2 and 3 are designed so as to form hub portions of the composite wheel 4, FIG. 2 showing such a hub portion 2, 3 from the side, viewed relative to the central axis. The preforms 1, 2 and 3 are built up from mats 5, with a fiber orientation diagrammatically shown in the drawings by means of the hatching. The mats 5 have a weaving pattern with two fiber orientations directed substantial transversely to each other and are substantially oriented in a circumferential direction and/or in a radial direction of the preforms 1, 2 and 3. The mats 5 are cut from fiber mats in fixed basic patterns.

The mats 5 used when building up the preforms 1, 2 and 3 have a relatively small size and a predetermined fixed basic shape. Preferably, the size of the basic shapes ranges between 5% and 20% of the greatest length of the built-up preform. In practice, when manufacturing the wheel described in this exemplary embodiment, eight different basic shapes are used. In a mold a few layers of these mats, in this exemplary embodiment varying from eight to eighteen layers, are placed over each other imbricately, that is to say in each case with a certain degree of overlap, the orientation of the fibers always being directed substantially radially/tangentially. By way of alternative, the mats may also be laid in the mold abuttingly, that is to say with the sides against each other. The fabrics give the wheel very favorable strength properties, because it is possible to control the fiber orientation of the mats very accurately. The angular deviation of the orientation of the mats relative to the radial/tangential direction of the wheel to be formed is preferably not more than 5°. The fibers of both directions of orientation preferably have an equal strength, so that a good ratio of fibers oriented in a first direction to fibers oriented transversely to that first direction is within the range of 0.7–1.4 per unit weight; it is preferably 1. According as the basic shape is selected to be smaller, it is possible to direct the orientation more radially/tangentially; in this case, however, the efficiency of the manufacturing process decreases.

The mats are provided with an agent bonding under the influence of heat, also called a "tackifier"; after the mats have been placed in the mold correct, this mold is closed by a rubber closing cap, so that the mats are enclosed between the bottom of the mold and the rubber closing cap. After closing this cap, the whole is vacuum sucked, so that the mats are firmly pressed together into the desired shape of the preform. Subsequently, by means of infrared heat sources the whole is heated for some time, so that under the influence of the heat the mats are bonded together by the tackifier.

The assembly of the wheel takes place by inserting the hub portions 2, 3 in the rim portion 1 in the direction of the arrows P. As shown in FIG. 2, the hub portions 2 and 3 are designed in the shape of a cup and have an end face 6 and a raised edge 7. The end face 6 extends in the radial direction of the wheel 4 to be formed. The raised edge 7 extends predominantly in the axial direction thereof. In a combined condition of the preforms 1, 2 and 3 the outer side of the raised edge portion 7 extends along at least part of the inner side 8 of the rim portion 1.

The hub portions 2 and 3 possess a concentric circular opening 9 provided in the end face 6. Regularly spaced around this opening 9 are a number of bores 10; in a wheel manufactured according to this exemplary embodiment this number was ten.

Figure 3:
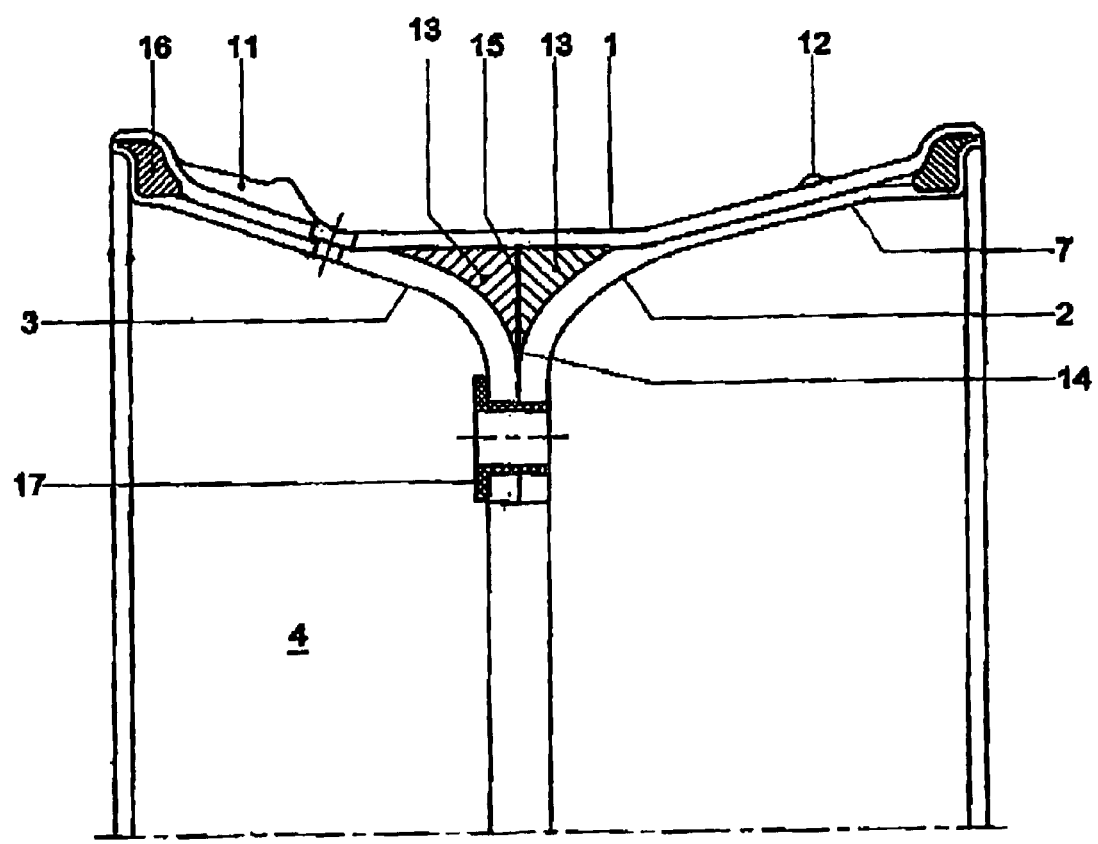
FIG. 3 is a cross-section of the wheel according to the invention, viewed from a direction transverse to the central axis.

By mean of carbon rope or glass fiber (glass mat) the preform can be further finished, if necessary to trim details of the preform a little further. In a wheel manufactured according to this exemplary embodiment, for instance, as shown in FIG. 3, by mans of carbon rope, a reinforcement was arranged on the shoulder 11, which forms the point of engagement of the tire. A so-called "hump" 12 of glass fiber was arranged on the rim edge; such a hump forms a protection for the tire against running off the wheel in case of a punctured tire.

On the inner side 8 of the rim portion two polyurethane rings 13 are mounted. These rings 13 have a triangular cross-section of such a shape that in the next step of compressing the rim portion 1 and the hub portions 2, 3 the space 14 between the rim portion 1 and the hub portions 2, 3 is nearly completely filled in the plane of the end face. This is necessary to prevent open spaces present in the wheel from being filled with synthetic resin without fiber reinforcement being provided therein; such parts would make the structure unnecessarily heavy and be disadvantageous to the strength thereof. Arranged between the polyurethane rings 13 is a layer of glass fiber mat 15. This layer 15 serves as a transport material to pass the resin through the structure. On the outer sides of the rim portion 1 two circular edge portions 16 form a reinforcing connection between the rim portion 1 and the respective hub portions 2 and 3.

In the impregnating step the compressed whole is placed in an impregnating mold and enclosed. Metal bushes 17, preferably aluminum bushes, are inserted in the bores 10, so that the bushes are firmly stuck to the fiber structure by form-closing during the impregnation.

The injection of synthetic resin into the impregnating mold takes place via injection openings 18 shown in FIG. 2. The injection openings 18 discharge on the outer side of the rim portion 2 (not shown in FIG. 2). On this side, in the plane 19 coinciding with the end face 6 of the hub portion 2 inserted in the rim portion 1, the injection openings 18 are regularly spaced apart in the mold (not shown). The combination of injection openings 18 thus positioned and the above-mentioned transport strip of glass fiber achieves a very uniform and optimum impregnation of the compressed whole, in which the resin cures from the most remote parts from the injection openings. What is thus prevented is that certain parts of the compressed preform are not reached by the resin, which would be very disadvantageous to the strength/stiffness of the structure. On the other hand, what is thus prevented as much as possible is that when curing shrinkage effects introducing unfavorable tensions into the structure occur, which is likewise disadvantageous to the strength/stiffness.

After the wheel thus formed has been removed from the impregnating mold, the wheel is finished and provided with a UV-resistant plastic cap, which is stuck to the hub portion 3, for instance with epoxy glue.

It will be clear to those skilled in the art that the invention is not limited to the exemplary embodiments described with reference to the drawings, but may comprise all kinds of variations thereof. Thus, in the above description of the drawings an embodiment of a wheel according to the invention has been discussed with two cup-shaped hub portions 2, 3 facing each other with the end faces. The invention, however, may also be applied with a single hub portion inserted in a rim portion and compressed from one side. In this embodiment the rim portion needs to be of a heavier design, at least on the side opposite the hub portion.

Such variations are deemed to be within the scope of protection of the appended claims.

What is claimed is:

1. A method of manufacturing a composite wheel, wherein:
   building up at least two separate preforms (1, 2, 3), which preforms form respectively a hub portion (2, 3) and a rim portion (1) of the wheel, by compressing mats of oriented fibers (5) into each of the respective preforms;
   combining the separate preforms;
   compressing them into one whole; and
   impregnating this compressed whole with a synthetic resin.

2. A method according to claim 1, wherein the preforms are built up by
   designing the hub portion (3) in the shape of a cup, such that an end face (6) thereof extends in the radial direction of the wheel (4) to be formed, and that a raised edge (7) extends predominantly in the axial direction of the wheel to be formed, and
   designing the rim portion (1) such that when combining the preforms the raised edge portion of the hub portion extends along at least part of the inner side (8) of the rim portion.

3. A method according to claim 2, wherein the preforms are combined by the insertion in a rim portion, in the axial direction on both sides thereof, of two cup-shaped hub portions (2, 3) facing each other with the end faces.

4. A method according to claim 1, wherein closed open spaces (14) formed by combining the preforms are filled in with a non-impregnable material and by a transport material (15) leading the resin through the space (14) along predetermined paths.

5. A method according to claim 4, wherein the material that cannot be impregnated by resin is polyurethane (13).

6. A method according to claim 4, wherein the transport material consists of glass fiber strips.

7. A method according to claim 1, wherein the preforms are built up by cutting mats (5) from larger woven fiber mats, with a weaving pattern with two fiber orientations directed substantially transversely to each other, and which are provided with an agent boding under the influence of heat;

substantially orienting the fibers of the mats in a circumferential direction and/or in a radial direction of the preform and;

maintaining the shape or the mats under vacuum and heating the mats until the preform (1, 2, 3) has been formed.

8. A method according to claim 7, wherein the orientation of fibers deviates by at most 10° relative to the radial/tangential direction of the wheel to be formed.

9. A method according to claim 8, wherein the orientation of fibers deviates by at most 5° relative to the radial/tangential direction.

10. A method according to claim 7, wherein the ratio of the fibers oriented in a first direction to fibers oriented transversely to that first direction is within the range of 0.7–1.4 per unit weight.

11. A method according to claim 10, wherein the ratio is 1 per unit weight.

12. A method according to claim 1, wherein the preforms 1 are built up with mats (5) having a relatively small size and a predetermined fixed basic shape.

13. A method according to claim 1, wherein the manufacture of the wheel comprises further steps of providing a number of bores (10) in the compressed whole; and arranging therein closely fitting metal bushes (16) before the impregnating step.

14. A method according to claim 2, wherein the impregnating step is carried out by injecting synthetic resin into the compressed whole in a direction substantially in one plane with the end face (6) of the hub portion (2, 3).

* * * * *